United States Patent
Matsukawa et al.

(10) Patent No.: US 8,432,058 B2
(45) Date of Patent: Apr. 30, 2013

(54) POWER SUPPLY DEVICE

(75) Inventors: Yasushi Matsukawa, Toyohashi (JP); Duncan Bullock, Nagoya (JP); Tetsuya Mizoguchi, Kosai (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 1017 days.

(21) Appl. No.: 12/026,251

(22) Filed: Feb. 5, 2008

(65) Prior Publication Data
US 2008/0185999 A1 Aug. 7, 2008

(30) Foreign Application Priority Data
Feb. 6, 2007 (JP) ................... 2007-027078

(51) Int. Cl.
*B60L 11/18* (2006.01)
*B60R 16/03* (2006.01)

(52) U.S. Cl.
USPC ........................ 307/9.1; 307/10.1; 307/130

(58) Field of Classification Search ............... 307/9.1, 307/10.1, 130
See application file for complete search history.

(56) References Cited

U.S. PATENT DOCUMENTS

| | | | | |
|---|---|---|---|---|
| 5,574,632 A | * | 11/1996 | Pansier | 363/49 |
| 5,717,310 A | * | 2/1998 | Sakai et al. | 307/10.1 |
| 5,804,973 A | * | 9/1998 | Shinohara et al. | 324/548 |
| 5,994,789 A | * | 11/1999 | Ochiai | 307/10.1 |
| 6,194,792 B1 | * | 2/2001 | Yanou et al. | 307/10.1 |
| 6,335,574 B1 | | 1/2002 | Ochiai et al. | |
| 6,657,833 B2 | * | 12/2003 | Matsuki et al. | 361/23 |
| 6,828,742 B2 | * | 12/2004 | Suzuki et al. | 318/139 |
| 6,966,803 B2 | * | 11/2005 | Hara et al. | 440/6 |
| 7,113,380 B2 | * | 9/2006 | Youm | 361/91.1 |
| 7,242,196 B2 | * | 7/2007 | Yudahira et al. | 324/420 |
| 7,368,829 B2 | * | 5/2008 | Tezuka | 307/9.1 |
| 7,404,459 B2 | * | 7/2008 | Nakanishi et al. | 180/65.1 |
| 7,570,021 B2 | * | 8/2009 | Togashi et al. | 320/130 |
| 7,608,940 B2 | * | 10/2009 | Osawa | 307/10.7 |
| 7,843,706 B2 | * | 11/2010 | Suzuki et al. | 363/16 |
| 2007/0138998 A1 | * | 6/2007 | Togashi et al. | 320/104 |
| 2010/0038962 A1 | * | 2/2010 | Komatsu | 307/10.1 |

FOREIGN PATENT DOCUMENTS

| | | |
|---|---|---|
| JP | 10-014104 | 1/1998 |
| JP | 10-304501 A | 11/1998 |
| JP | 2001-065437 | 3/2001 |
| JP | 2001-128305 | 5/2001 |
| JP | 2004-120866 | 4/2004 |
| JP | 2005-269742 | 9/2005 |
| JP | 2005269742 A * | 9/2005 |
| JP | 2005295697 A * | 10/2005 |
| JP | 2006-262586 | 9/2006 |

* cited by examiner

*Primary Examiner* — Adi Amrany
(74) *Attorney, Agent, or Firm* — Workman Nydegger

(57) ABSTRACT

A power supply device that enables completion of precharging to be accurately determined without increasing manufacturing cost. The power supply device includes a battery pack, a positive main contactor, a precharge contactor, and a precharge resistor. The battery pack supplies DC power to an inverter. A smoothing capacitor is arranged between input terminals of the inverter. The positive main contact disconnects the inverter from a positive electrode of the battery pack. A voltmeter detects the voltage between a negative electrode of the battery pack and a connection node of the precharge contactor and precharge resistor. Voltage detection values taken by the voltmeter immediately before precharging and during precharging are used to determine precharging completion.

11 Claims, 3 Drawing Sheets

(a) Ignition Switch
(b) Negative Main Contactor
(c) Precharge Contactor
(d) Positive Main Contactor
(e) Voltage Detection Value

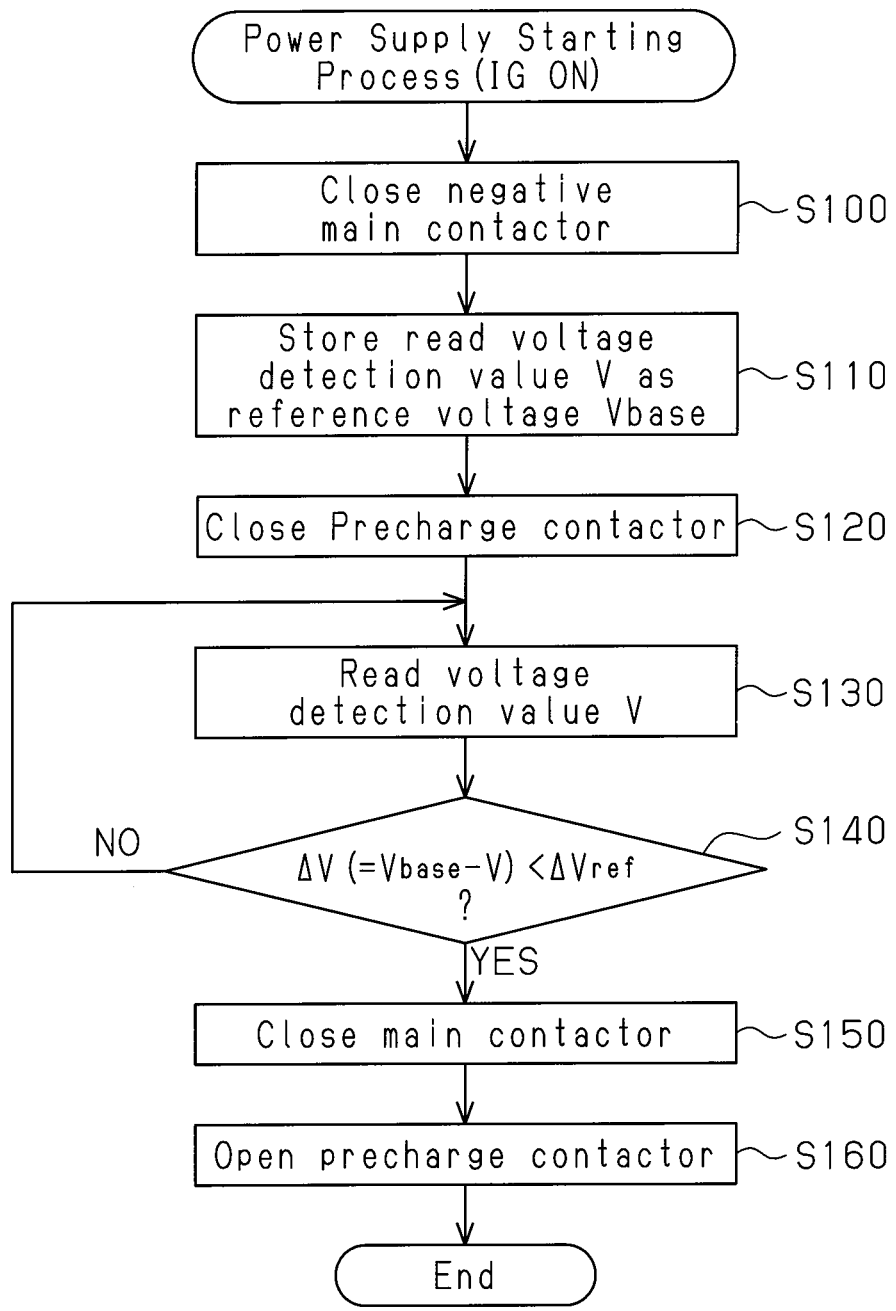

POWER SUPPLY DEVICE

CROSS-REFERENCE TO RELATED APPLICATIONS

This application is based upon and claims the benefit of priority from the prior Japanese Patent Application No. 2007-027078, filed on Feb. 6, 2007, the entire contents of which are incorporated herein by reference.

BACKGROUND OF THE INVENTION

The present invention relates to a power supply device that precharges a smoothing capacitor arranged in a load when starting to supply the load with power, and more particularly, to an improved detection structure that increases the accuracy for determining completion of precharging.

An electric vehicle, which uses a motor as a drive source, typically converts high voltage direct current (DC) power to alternating current (AC) power with an inverter to drive a motor. A DC power supply, which is formed by a battery pack, supplies the high voltage DC power. Normally, an electrolytic capacitor, which has a large capacitance, is arranged between input terminals of the inverter to smooth voltage fluctuations in the supplied DC power. However, when the supply of power is started, the arrangement of such a smoothing capacitor results in a problem. When the supply of power to the inverter is started in a state in which the smoothing capacitor is not sufficiently charged, the smoothing capacitor is rapidly charged immediately after the supply of power starts. As a result, a large amount of current flows to a main contactor, which is connected to the inverter to supply power. This may fuse the contacts of the main contactor.

Therefore, a power supply device normally precharges the smoothing capacitor before starting to supply power to the inverter. FIG. 1 shows the circuit configuration of a power supply device that precharges a smoothing capacitor. The power supply device shown in FIG. 1 includes a battery pack 50, which is a DC power supply. The battery pack 50 has a positive electrode (+) and a negative electrode (−) connected via a positive main contactor 51 and a negative main contactor 52 to a positive input terminal and a negative input terminal of an inverter 53, respectively. A large capacitance electrolytic capacitor, or smoothing capacitor 54, is connected between the two input terminals of the inverter 53. A precharge contactor 55 is connected in parallel to the positive main contactor 51. Further, a precharge resistor 56 is connected in series to the precharge contactor 55 to restrict the flow of current during precharging.

In such a power supply device, the starting of power supply to the inverter 53 is controlled in the following manner. First, the negative main contactor 52 is closed. Then, the precharge contactor 55 is closed. This starts the precharging of the capacitor 54. In this state, the precharge resistor 56 restricts the flow of current. Thus, the capacitor 54 is gradually charged. When it is determined that the precharging has been completed, the positive main contactor 51 is closed to start supplying power to the inverter 53.

Normally, the completion of precharging is determined by detecting the voltage between the terminals of the capacitor 54 with a voltmeter. Referring to FIG. 2, a curve L indicates the shifting of the voltage between the terminals of the capacitor 54 (precharge voltage Vpc). As shown by curve L, after precharging starts at time t0, the precharge voltage Vpc gradually increases from 0 V and ultimately saturates at a certain voltage (saturation voltage Vst). The saturation voltage Vst is equal to the power supply voltage of the battery pack 50 subsequent to the voltage decrease caused by the precharge resistor 56. Accordingly, a voltage determination value Vref, which is slightly lower than the saturation voltage Vst, is set to determine precharging completion when the precharge voltage Vpc exceeds the voltage determination value Vref.

However, the determination of the precharging completion based on the precharge voltage Vpc has a shortcoming in which the power supply voltage of the battery pack 50 may increase or decrease drastically due to various conditions, such as wear, individual differences, and the charge level. In such a case, the saturation voltage would vary accordingly. Thus, when set at a fixed value that is constant, the voltage determination value Vref would not be applicable for such changes in the power supply voltage. As a result, the precharging completion may not be properly determined. For example, as shown by curve L' in FIG. 2, when the power supply voltage of the battery pack 50 is low, the precharge voltage Vpc would saturate at a saturation voltage Vst', which corresponds to such a low power supply voltage state and which is lower than the saturation voltage Vst. Therefore, even if precharging is actually completed, the precharge voltage Vpc does not reach the voltage determination value Vref. In such a case, precharging completion would not be determined no matter how much time elapses. On the other hand, as shown by curve L", when the power supply voltage of the battery pack 50 is high, the precharge voltage Vpc would reach the voltage determination value Vref before reaching a saturation voltage Vst", which corresponds to such a high power supply voltage state. Therefore, the supply of power to the inverter 53 would be started in a state in which precharging is still insufficient. As a result, a large current may fuse the contacts of the positive main contactor 51. In such a manner, when the voltage determination value Vref is constantly fixed, the precharging completion determination, which is based on the precharge voltage Vpc, may be inaccurate when the power supply voltage varies.

Accordingly, in the prior art, Japanese Laid-Open Patent Publication No. 10-304501 describes a scheme for determining precharging completion from a precharge current Ipc. In this scheme, the current that flows from the battery pack 50 to the smoothing capacitor 54 during precharging, that is, the precharge current Ipc, is used to determine precharging completion. Referring to FIG. 3, the precharge current Ipc gradually decreases as the smoothing capacitor 54 becomes charged and ultimately saturates at 0 A. The saturation value 0 A of the precharge current is constant and fixed regardless of the power supply voltage of the battery pack 50. Thus, in the scheme described in the above publication, a current determination value Iref, which is slightly higher than 0 A, is set to determine precharging completion when the precharge current Ipc becomes less than the current determination value Iref.

A change in the power supply voltage would not affect the precharging completion determination when using the precharge current Ipc. However, the actual determination accuracy would become insufficient due to detection errors of the precharge current Ipc. More specifically, the current supplied to the smoothing capacitor 54 during precharging is restricted by the precharge resistor 56 and thus small. The current becomes even smaller as the smoothing capacitor 54 becomes charged. As a result, even if relatively small noise is superimposed on the precharge current Ipc, this would significantly affect the detection accuracy. In this manner, the precharging completion determination would be easily affected by noise. Thus, the accuracy detection of the precharge current Ipc, which has a low S/N ratio, would become insufficient. This would result in insufficient accuracy for the detection of precharging completion. Hence, to accurately perform precharging completion determination based on the precharge current Ipc, sufficient noise measures must be taken. Otherwise, an ammeter having a high resolution must be used. In such cases, the manufacturing costs would increase.

Such a problem is not limited to a power supply device that is used with an inverter and is common in any power supply device that supplies DC power to a load including a large capacitance smoothing capacitor and precharges a smoothing capacitor when starting the supply of power. Therefore, for a power supply device of which power supplying subject is a load including a smoothing capacitor that undergoes precharging, it is desired that precharge completion be accurately determined without increasing manufacturing costs regardless of the type of load.

SUMMARY OF THE INVENTION

The present invention provides a power supply device that enables precharging completion to be accurately determined without increasing manufacturing costs.

One aspect of the present invention is a power supply device having a load including a smoothing capacitor used for precharging. A direct current power supply supplies direct current power to the load and which includes a first electrode and a second electrode. A main contactor is arranged between the load and the first electrode of the direct current power supply. A precharge contactor is connected in parallel to the main contactor. A precharge resistor is connected in parallel to the main contactor and in series to the precharge contactor between the direct current power source and the precharge contactor. The smoothing capacitor undergoes precharging via the precharge resistor when the precharge contactor closes. A voltage detection unit detects voltage between the second electrode of the direct current power supply and a connection node of the precharge contactor and the precharge resistor.

A further aspect of the present invention is a method for controlling precharging performed by a power supply device. The power supply device includes a load having a smoothing capacitor used for precharging. A direct current power supply supplies power supply voltage to the load and has a first electrode and a second electrode. A main contactor is arranged between the load and the first electrode of the direct current power supply. A precharge contactor is connected in parallel to the main contactor. A precharge resistor is connected in parallel to the main contactor and connected in series to the precharge contactor between the direct current power source and the precharge contactor. A voltage detection unit is connected between the second electrode of the direct current power supply and a connection node of the precharge contactor and the precharge resistor. The method includes obtaining a first voltage detection value detected by the voltage detection unit in a state in which the precharge contactor is open, obtaining a second voltage detection value detected by the voltage detection unit in a state in which the precharge contactor is closed, and determining whether precharging has been completed based on the first voltage detection value and the second voltage detection value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a flowchart showing a power supply starting process implemented by the power supply device of the preferred embodiment.

DETAILED DESCRIPTION OF THE PREFERRED EMBODIMENTS

Figure 1:
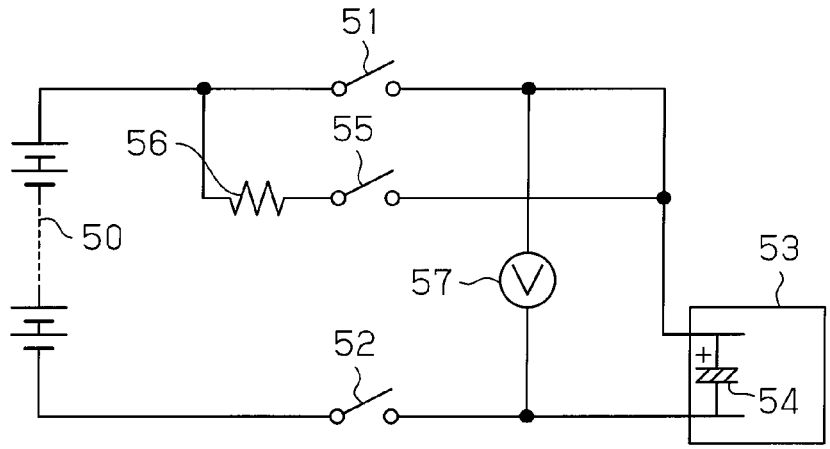
FIG. 1 is a circuit diagram of a prior art power supply device.
Figure 2:
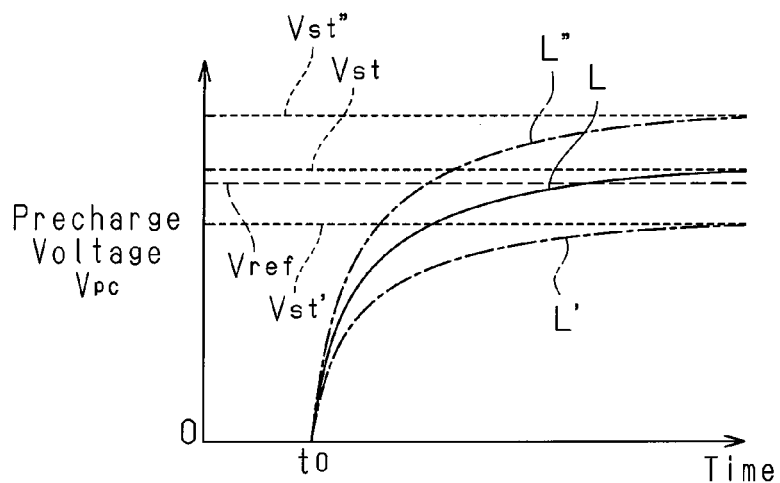
FIG. 2 is a graph showing the shifting of a precharge voltage used by the prior art power supply device to determine precharging completion when starting the supply of power.
Figure 3:
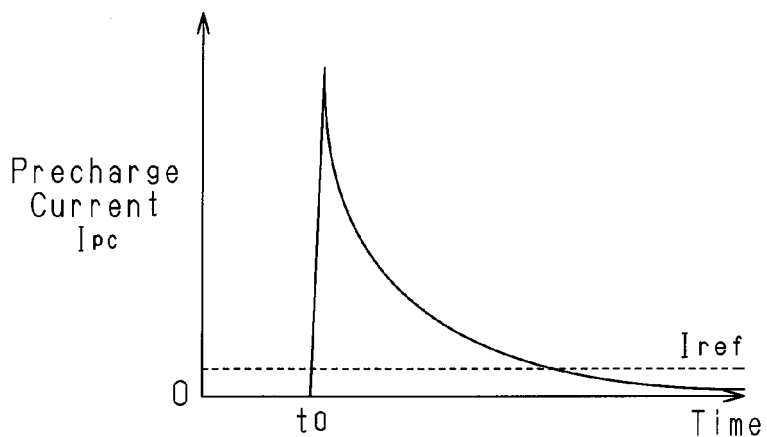
FIG. 3 is a graph showing the shifting of a precharge current used by another prior art power supply device to determine precharging completion when starting the supply of power.

In the drawings, like numerals are used for like elements throughout. A power supply device of the preferred embodiment supplies power to an electric vehicle inverter, which serves as a load.

Figure 4:
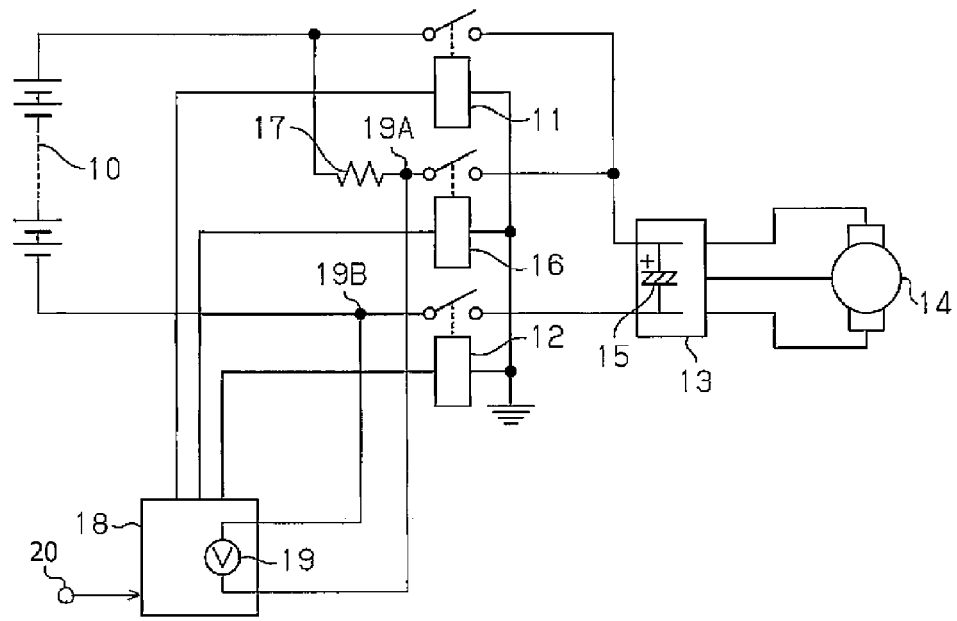
FIG. 4 is a circuit diagram of a power supply device according to a preferred embodiment of the present invention.

The configuration of the power supply device will first be described. Referring to FIG. 4, the power supply device includes a battery pack 10, which is a direct current (DC) power supply. The battery pack 10 has a positive electrode (+) and a negative electrode (−) connected via a positive main contactor 11 and a negative main contactor 12 to a positive input terminal and a negative input terminal of an inverter 13, respectively. The inverter 13 converts direct current (DC) power, which is supplied from the battery pack 10, to alternating current (AC) power. The inverter 13 has an output terminal, which outputs the AC power and which is connected to a motor 14. Further, the inverter 13 has two input terminals. A large capacitance electrolytic capacitor, or smoothing capacitor 15, is connected between the two input terminals of the inverter 13 to lessen voltage fluctuations in the supplied DC power and stabilize the operation of the inverter 13. A precharge contactor 16 is connected in parallel to the positive main contactor 11. Further, a precharge resistor 17 is connected in series to battery pack side of the precharge contactor 16 to restrict the flow of current during precharging. In other words, the precharge resistor 17 is connected in series to the precharge contactor 16 between the precharge contactor 16 and the battery pack 10 (positive electrode in the preferred embodiment).

In the power supply device, the main contactors 11 and 12 are respectively connected to the positive and negative sides of the battery pack 10 as described above. When the supply of power is stopped, the main contactors 11 and 12 open to electrically disconnect the inverter 13 from the battery pack 10. When the supply of power is stopped, the smoothing capacitor 15 is immediately discharged.

A controller 18, which is formed by a microcomputer, controls the opening and closing of the contactors 11, 12, and 16. The controller 18 incorporates a voltmeter 19, which detects voltage, and is provided with an open-close signal from an ignition switch 20. Based on the detection result of the voltmeter 19 or the open-close signal of the ignition switch 20, the controller 18 controls the opening and closing of the contactors 11, 12, and 16 to start the supply of power to the inverter 13.

In the power supply device of the preferred embodiment, voltage detection points are set for the voltmeter 19 in the following manner. A voltage detection point 19A for the positive side (i.e., positive terminal) of the voltmeter 19 is set at a connection node between the precharge resistor 17 and the precharge contactor 16. Further, a voltage detection point 19B for the negative side (i.e., negative terminal) of the voltmeter 19 is set at a connection node between the negative electrode of the battery pack 10 and the negative main contactor 12.

In the power supply device of the preferred embodiment, when the ignition switch 20 closes, the controller 18 starts supplying power to the inverter 13 by performing the following procedures (1) to (3).

(1) Close negative main contactor 12.
(2) Close precharge contactor 16 and start precharging smoothing capacitor 15.
(3) After completion of precharging, close the positive main contactor 11 and open the precharge contactor 16.

During the period between procedures (1) and (2), that is, immediately before precharging is performed in a state in which only the negative main contactor 12 is closed, the voltmeter 19 shows a voltage detection value V indicating the power supply voltage of the battery pack 10 subsequent to the voltage decrease caused by the precharge resistor 17. In this state, the voltage detection value V indicates the saturation voltage Vst, that is, the ultimate voltage between the terminals of the smoothing capacitor 15 when precharging is continued with the power supply voltage of the battery pack 10 that is decreased by the precharge resistor 17. During the period between procedures (2) and (3), that is, during precharging, the voltmeter 19 shows a voltage detection value V indicating the voltage between the terminals of the smoothing capacitor 15 (precharge voltage Vpc).

As described above, when the power supply voltage of the battery pack 10 changes, the saturation voltage Vst varies accordingly. Thus, the completion of precharging cannot be accurately determined just by referring to the precharge voltage Vpc. However, the power supply device of the preferred embodiment determines the saturation voltage Vst from the voltage detection value V of the voltmeter 19 before the precharging. This enables the completion of precharging to be accurately determined from the precharge voltage Vpc. In addition, the detection of the saturation voltage Vst and the precharge voltage Vpc can be performed with a simple detection structure that uses only one voltmeter 19. This prevents the manufacturing costs from increasing. Thus, for example, the prior art power supply device shown in FIG. 1 may be configured to become equivalent to the power supply device of the preferred embodiment just by changing the voltage detection points of the voltmeter 57.

In the power supply device of the preferred embodiment, it is preferable that the controller 18 perform precharging completion determination in the following manner. First, the controller 18 stores the voltage detection value V of the voltmeter 19 taken immediately before the precharging as a reference voltage Vbase. Then, when precharging is being performed, the controller 18 determines that the precharging has been completed when the difference $\Delta V$ (i.e., Vbase−V) of the voltage detection value V from the reference base Vbase becomes less than a determination value $\Delta V$ref ($\Delta V < \Delta V$ref). The determination value $\Delta V$ref is set at the upper limit value of the voltage between the terminals of the positive main contactor 11 that avoids damages to the contacts of the contactor 11 when closed. If the determination value $\Delta V$ref is not set properly, a first contact of the contactor 11 connected to the positive electrode of the battery pack 10 and a second contact of the contactor 11 connected to the smoothing capacitor 15 may be fused. This may inflict damages to the contacts of the contactor 11. To prevent such a problem, the determination value $\Delta V$ref is set at the upper limit value of the voltage between the first and second contacts when the contactor 11 is closed.

Figure 5:
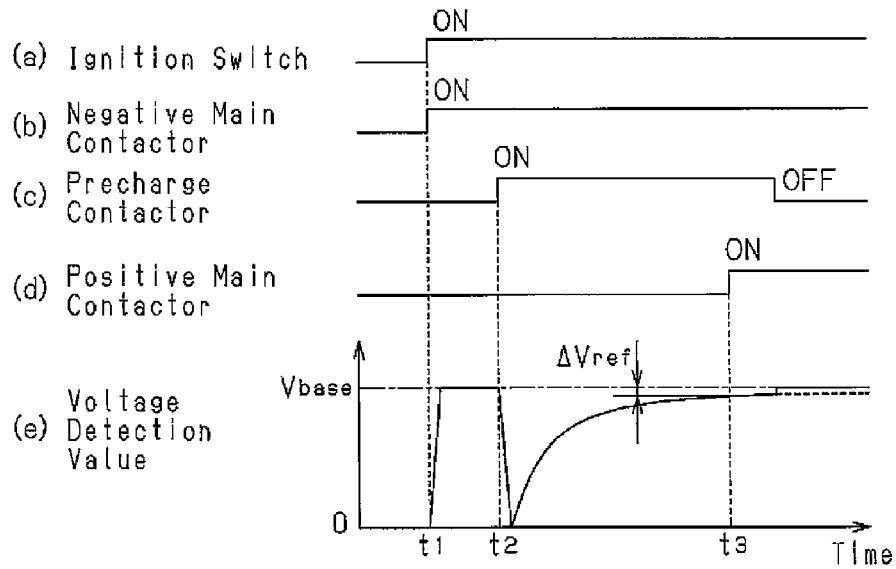
FIG. 5 is a timing chart showing an example of a control routine executed when the power supply device of the preferred embodiment starts to supply power.

FIG. 5 is a timing chart showing an example of a control routine executed by the power supply device of the preferred embodiment when starting the supply of power to the inverter 13. In the chart, waveforms (a) to (d) respectively show the open and close (ON/OFF) state of the ignition switch 20, the negative main contactor 12, the precharge contactor 16, and the positive main contactor 11. Further, in the chart, waveform (e) shows the shifting of the voltage detection value V of the voltmeter 19.

At time t1, when the ignition switch 20 closes, the negative main contactor 12 is closed. The voltage detection value V of the voltmeter 19 in this state is stored in the controller 18 as the reference voltage Vbase for determining precharging completion.

Then, at time t2, the precharge contactor 16 closes. This starts the precharging of the smoothing capacitor 15. When the precharging starts, as shown by waveform (e), the voltage detection value V of the voltmeter 19 temporarily decreases to 0 V and then gradually increases as the smoothing capacitor 15 is charged.

At time t3, the difference $\Delta V$ of the voltage detection value V from the reference voltage Vbase, that is, the difference between the present power supply voltage of the battery pack 10 and the precharge voltage becomes less than the determination value $\Delta V$ref. The positive main contactor 11 then closes, and the precharge contactor 16 then subsequently opens. This starts the supply of power and activates the inverter 13.

FIG. 6 is a flowchart showing a power supply starting process implemented by the controller 18. When the ignition switch 20 closes, the controller 18 starts this process.

When the process is started, the controller 18 closes the negative main contactor 12 (S100). Then, the controller reads the present voltage detection value V of the voltmeter 19 and stores the read value as the reference value Vbase (S110).

Next, the controller 18 closes the precharge contactor 16 and starts precharging the smoothing capacitor 15 (S120). Thereafter, the controller 18 periodically reads the voltage detection value V of the voltmeter 19 (S130). Whenever reading the voltage detection value V, the controller 18 determines whether the difference $\Delta V$ of the read voltage detection value V from the previously stored reference voltage Vbase (i.e., Vbase−V) is less than the determination value $\Delta V$ref (S140).

The controller 18 continues precharging until the voltage difference $\Delta V$ becomes less than the determination value $\Delta V$ref. When the difference $\Delta V$ becomes less than the determination value $\Delta V$ref (S140: YES), the controller 18 closes the positive main contactor 11 (S150). Then, the controller 18 opens the precharge contactor 16 (S160) and starts supplying power to the inverter 13. Afterwards, the controller 18 ends the power supply starting process.

In the power supply device of the preferred embodiment, the positive main contactor 11 serves as a main contactor, and the precharge contactor 16 serves as a precharge contactor. Further, the positive electrode (+) of the battery pack 10 serves as a first electrode of a DC power supply, and the negative electrode (−) of the battery pack 10 serves as a second electrode of the DC power supply. Moreover, the voltmeter 19 incorporated in the controller 18 serves as a voltage detection unit, and the controller 18 serves as a precharging completion determination unit.

The power supply device of the preferred embodiment has the advantages described below.

(1) In the power supply device of the preferred embodiment, the voltmeter 19 is arranged so as to enable detection of voltage between the negative electrode of the battery pack 10 and a connection node of the precharge contactor 16 and precharge resistor 17. Accordingly, the power supply voltage immediately before precharging, or the precharge saturation voltage Vst, and the voltage between the terminals of the smoothing capacitor 15 during precharging, or the precharge voltage Vpc, are both detected with a single voltmeter 19. Thus, the completion of precharging is accurately determined without increasing manufacturing costs. This further ensures that damages are not inflicted to the contacts of the positive main contactor 11.

(2) The power supply device of the preferred embodiment determines completion of precharging when the difference ΔV between the voltage detection value V of the voltmeter 19 immediately before precharging and the voltage detection value V during precharging becomes less than the determination value ΔVref. Thus, even if the precharge saturation voltage Vst varies in accordance with the power supply voltage of the battery pack 10, it is ensured that precharging completion is determined at a timing at which the precharge voltage Vpc reaches the vicinity of the saturation voltage Vst.

In the power supply device of the preferred embodiment, the condition for determining precharging completion is not limited to the difference ΔV being less than the determination value ΔVref and may be modified as described below.

For example, a predetermined constant K1 may be subtracted from the power supply voltage of the battery pack 10 that is obtained from the voltage detection value V of the voltmeter 19 immediately before precharging (i.e., reference voltage Vbase) to set the voltage determination value Vref (i.e., Vbase−K1) for determining precharging completion. The completion of precharging is determined under the condition that the voltage detection value V during precharging exceeds the voltage determination value Vref. By setting the constant K1 as the upper limit value of the voltage between the contacts of the positive main contactor 11 that resists damage to the contacts, the proper timing for completing precharging is accurately determined.

Further, if the predicted fluctuation range of the power supply voltage of the battery pack 10 is significantly smaller than the reference value of the power supply voltage, the completion of precharging may be determined in the following manner.

The power supply voltage of the battery pack 10 obtained from the voltage detection value V of the voltmeter 19 immediately before precharging (reference voltage Vbase) is multiplied by a constant K2 of less than "1" to set a voltage determination value Vref (i.e., K2×Vbase) for determining the completion of precharging. The completion of precharging is determined under the condition that the voltage detection value V during precharging exceeds the voltage determination value Vref.

If other schemes are employed to determine precharging completion, recognition of the power supply voltage of the battery pack 10 based on the voltage detection value V of the voltmeter 19 immediately before precharging would enable accurate determination of precharging completion. As the voltage detection value V prior to precharging becomes higher, the voltage determination value Vref for determining precharging completion is set at a higher level. Accordingly, regardless of the power supply voltage level of the battery pack 10, precharging completion determination can be accurately performed so as to ensure that damage to the contacts of the positive main contactor 11 is avoided.

It should be apparent to those skilled in the art that the present invention may be embodied in many other specific forms without departing from the spirit or scope of the invention. Particularly, it should be understood that the present invention may be embodied in the following forms.

In the preferred embodiment, the precharge contactor 16 and the precharge resistor 17 may be connected in parallel to the negative main contactor 12. In this case, the voltmeter 19 detects the voltage between the positive electrode of the battery pack 10 and a connection node of the precharge contactor 16 and precharge resistor 17. Specifically, the voltage detection point 19A for the positive side of the voltmeter 19 is set at a connection node between the positive electrode of the battery pack 10 and the positive main contactor 11. The voltage detection point 19B for the negative side of the voltmeter 19 is set at a connection node between the precharge contactor 16 and the precharge resistor 17.

In the preferred embodiment, the main contactors 11 and 12 are respectively arranged at the positive and negative sides of the battery pack 10. However, when there is no need to electrically separate the inverter 13 from the battery pack 10 when the supply of power is stopped, the negative main contactor 12 may be eliminated. In such a case, the voltage detection point 19B for the negative side of the voltmeter 19 may be set at any position between the negative electrode of the battery pack 10 and the negative input terminal of the inverter 13. In the same manner, when the precharge contactor 16 and the precharge resistor 17 are connected in parallel to the negative main contactor 12, the positive main contactor 11 may be eliminated.

In the preferred embodiment, a power supply other than the battery pack 10 may be used as the DC power supply.

In the preferred embodiment, a load other than the inverter 13 may be used as the subject supplied with power.

The present examples and embodiments are to be considered as illustrative and not restrictive, and the invention is not to be limited to the details given herein, but may be modified within the scope and equivalence of the appended claims.

What is claimed is:

1. A power supply device comprising:
   a load including a smoothing capacitor used for precharging;
   a direct current power supply which supplies direct current power to the load and which includes a first electrode and a second electrode;
   a main contactor arranged between the load and the first electrode of the direct current power supply;
   a precharge contactor connected in parallel to the main contactor and including a first terminal electrically connected to the first electrode of the direct current power supply and a second terminal electrically connected to the load;
   a precharge resistor connected in parallel to the main contactor and in series to the precharge contactor between the first electrode of the direct current power source and the first terminal of the precharge contactor, wherein the smoothing capacitor undergoes precharging via the precharge resistor when the precharge contactor closes, and after completion of precharging, the main contactor is closed and the precharge contactor is open to start supplying the load with the direct current power;
   a voltage detection unit connected to a connection node, which is between the first terminal of the precharge contactor and the precharge resistor, and the second electrode of the direct current power supply, wherein the voltage detection unit obtains a first voltage detection value by detecting voltage between the connection node and the second electrode of the direct current power supply while the precharge contactor is open, wherein the first voltage detection value is a precharging saturation voltage corresponding to a power supply voltage supplied from the direct current power supply immediately before precharging is performed, and the voltage detection unit obtains a second voltage detection value by detecting voltage between the connection node and the second electrode of the direct current power supply while the precharge contactor is closed, wherein the second voltage detection value is a precharge voltage applied to the smoothing capacitor during precharging; and a determination unit which determines that precharging has been completed when the second voltage detection value becomes greater than a determination value set in accordance with the first voltage detection value.

2. The power supply device according to claim 1, wherein the determination value is set to be higher as the first voltage detection value becomes higher.

3. The power supply device according to claim 1, wherein the determination value is obtained by subtracting a predetermined constant from the first voltage detection value.

4. The power supply device according to claim 3, wherein:

the main contactor includes a first contact and a second contact that come into contact with each other when the main contactor is closed; and the predetermined constant is set at an upper limit value of the voltage between the first and second contacts that withstands fusing of the first and second contacts.

5. The power supply device according to claim 1, wherein the determination value is obtained by multiplying the first voltage detection value by a constant that is less than one.

6. The power supply device according to claim 1, further comprising:

an inverter for converting the direct current power supplied from the direct current power supply into alternating current power, wherein the inverter is supplied with power by the power supply device.

7. A method for controlling precharging performed by a power supply device, the power supply device including a load having a smoothing capacitor used for precharging, a direct current power supply for supplying power supply voltage to the load and having a first electrode and a second electrode, a main contactor arranged between the load and the first electrode of the direct current power supply, a precharge contactor connected in parallel to the main contactor and including a first terminal electrically connected to the first electrode of the direct current power supply and a second terminal electrically connected to the load, a precharge resistor connected in parallel to the main contactor and connected in series to the precharge contactor between the first electrode of the direct current power supply and the first terminal of the precharge contactor, and a voltage detection unit connected between a connection node, which is between the first terminal of the precharge contactor and the precharge resistor, and the second electrode of the direct current power supply, the method comprising:

obtaining, prior to precharging, a first voltage detection value by detecting voltage between the connection node and the second electrode of the direct current power supply by the voltage detection unit in a state in which the precharge contactor is open, wherein the first voltage detection value is a precharging saturation voltage corresponding to a power supply voltage supplied from the direct current power supply immediately before precharging is performed;

closing the precharge contactor to precharge the smoothing capacitor via the precharge resistor;

obtaining, during precharging, a second voltage detection value by detecting voltage between the connection node and the second electrode of the direct current power supply by the voltage detection unit in a state in which the precharge contactor is closed, wherein the second voltage detection value is a precharge voltage applied to the smoothing capacitor during precharging;

determining that precharging has been completed when the second voltage detection value becomes greater than a determination value set in accordance with the first voltage detection value; and after completion of precharging, starting to supply the load with the power supply voltage by closing the main contactor and opening the precharge contactor.

8. The method according to claim 7, wherein said setting the determination value includes setting the determination value to be higher as the first voltage detection value becomes higher.

9. The method according to claim 7, wherein said setting the determination value includes setting the determination value by subtracting a predetermined constant from the first voltage detection value.

10. The method according to claim 9, wherein:

the main contactor includes a first contact and a second contact that come into contact with each other when closed; and the predetermined constant is set at an upper limit value of the voltage between the first and second contacts that withstands fusing of the first and second contacts.

11. The method according to claim 7, wherein said setting the determination value includes setting the determination value by multiplying the first voltage detection value by a constant that is less than one.

* * * * *